(12) United States Patent
Kashiwazaki et al.

(10) Patent No.: US 6,663,092 B2
(45) Date of Patent: Dec. 16, 2003

(54) HOLDING APPARATUS

(75) Inventors: Toshio Kashiwazaki, Tokyo (JP);
Noriyuki Igarashi, Tokyo (JP); Haruki Nakajima, Tokyo (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 10/267,956

(22) Filed: Oct. 10, 2002

(65) Prior Publication Data

US 2003/0030293 A1 Feb. 13, 2003

Related U.S. Application Data

(62) Division of application No. 09/809,065, filed on Mar. 16, 2001, now Pat. No. 6,485,009.

(30) Foreign Application Priority Data

Mar. 17, 2000 (JP) ........................................ 2000-075271

(51) Int. Cl.$^7$ ............................................... B23F 19/04
(52) U.S. Cl. ......................................... 269/21; 294/64.1
(58) Field of Search .......................... 269/20, 21; 279/3; 451/235; 248/262, 263; 294/64.1, 65, 65.5; 414/627, 752, 737; 29/740, 743; 901/40; 271/94, 95

(56) References Cited

U.S. PATENT DOCUMENTS

| 4,651,396 A | * | 3/1987 | Kerlidou | 294/64.1 |
| 4,763,941 A | * | 8/1988 | Sniderman | 294/64.1 |
| 6,036,196 A | * | 3/2000 | Freund et al. | 269/21 |
| 6,260,898 B1 | * | 7/2001 | Kano et al. | 294/64.1 |

* cited by examiner

Primary Examiner—Robert C. Watson
(74) Attorney, Agent, or Firm—Birch, Stewart, Kolasch & Birch, LLP

(57) ABSTRACT

A device holding apparatus comprising a base plate; a hollow pad guard provided on the base plate; a pad pin inserted to the pad guard movably in an axis direction and having a through hole; a pad provided at a tip of the pad pin and having a through hole connected to the through hole of the pad pin; and a bellows pad provided on the base plate, having a through hole connected to the through hole of the pad pin and being elastic in the axis direction; for holding by suction a device by the pad by applying a negative pressure to the through hole of the bellows pad, the through hole of the pad pin and the through hole of the pad.

8 Claims, 6 Drawing Sheets

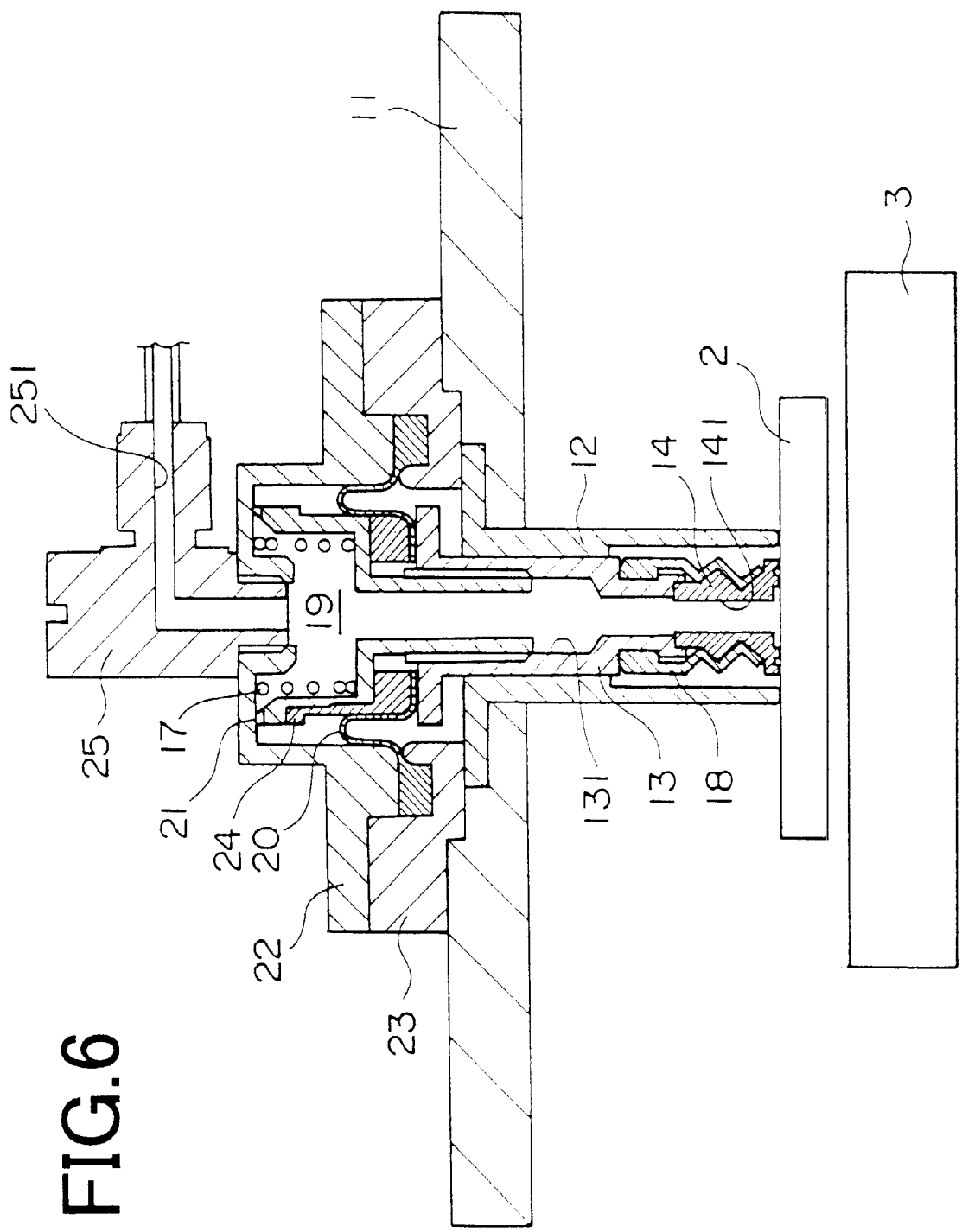

HOLDING APPARATUS

This application is a divisional of application Ser. No. 09/809,065, filed on Mar. 16, 2001, now U.S. Pat. No. 6,785,009 the entire contents of which are hereby incorporated by reference and for which priority is claimed under 35 U.S.C. §120; and this application claims priority of Application No. 2000-075271 filed in Japan on Mar. 17, 2000 under 35 U.S.C. §119.

BACKGROUND OF THE INVENTION

1. Field of the Invention

The present invention relates to a device holding apparatus preferably used for an electric device testing apparatus for testing a variety of electric devices, such as semiconductor integrated circuit element (hereinafter, referred to representatively as ICs).

2. Description of the Related Art

A testing apparatus for testing a finally produced device, such as an IC chip, is necessary in a producing process of a semiconductor device, etc. As one kind of such testing apparatuses, an electric device testing apparatus for testing an IC chip under applying a thermal stress of a normal temperature, a higher temperature and a lower temperature than a normal temperature is known. It is because IC chips are required to guarantee as a feature thereof to operate well under a normal, high and low temperature.

In this kind of an electric device testing apparatus, a test is conducted after a large number of pre-test IC chips loaded on a customer tray are reloaded on a test tray conveyed in the testing apparatus, and tested IC chips are reloaded to customer trays of different categories in accordance with the test result. A device holding apparatus called pick-and-place is used for such a reloading operation of IC chips.

There is known a device holding apparatus of the related art using a vacuum suction force wherein a rubber pad is used for absorbing impacts device errors and in a portion contacting an IC chip.

However, in a testing apparatus of a type conducting the reloading operation of IC chips in a low temperature chamber, an error in picking up an IC chip was liable to occur due to the rubber pad becoming hard in the low temperature environment. Also, there has been a disadvantage that static electricity charged in an IC chip cannot be removed when the IC chip contact portion was comprised of an insulator like rubber, etc.

Accordingly, adoption of a highly conductive metal pad was considered, however, an impact by a metal pad becomes large at the time of contacting an IC chip and the IC chip is liable to be damaged, so a speed of approaching to the IC chip had to be slower to prevent this, and it has been a bottleneck of the reloading operation at a higher speed.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

An object of the present invention is to provide a device holding apparatus excelling in an effect of removing static electricity and an effect of preventing damages on devices.

(1) According to a first aspect of the present invention, there is provided a device holding apparatus, comprising a base plate; a hollow pad guard provided on the base plate; a pad pin inserted to the pad guard movably in an axis direction and having a through hole; a pad provided at a tip of the pad pin and having a through hole connected to the through hole of the pad pin; and a bellows pad provided on the base plate, having a through hole connected to the through hole of the pad pin and being elastic in the axis direction; for holding by suction a device by the pad by applying a negative pressure to the through hole of the bellows pad, the through hole of the pad pin and the through hole of the pad.

In this device holding apparatus, a pad is approached to a device to contact, and in this state, a negative pressure is applied to a through hole of a bellows pad, a through hole of a pad pin and a through hole of a pad. As a result, the device is sucked by the pad, and at the same time, the bellows pad is shrank due to the negative pressure applied to the through hole and the device is sucked and picked up together with the pad and the pad pin.

In the present invention, a force acting on the device at the time of bringing the pad close to the device to contact is only own weights of the pad and the pad pin and an elastic force of the bellows pad. Accordingly, even when the pad approaches at a high speed, the force acting on the device is small and possibility of damaging the device becomes small. Furthermore, since the force acting on the device is small, the pad can be comprised of conductive metal materials and an effect of removing static electricity is large.

Note that when releasing the device, the negative pressure having been applied to the through hole of the bellows pad, through hole of the pad pin and through hole of the pad until then is stopped, or a positive pressure is brought to act to the contrary. As a result, the bellows pad having been shrank until then is stretched and the pad and the pad pin are lowered and the device is released.

(2) According to a second aspect of the present invention, there is provided a device holding apparatus comprising a base plate; a hollow pad guard provided on the base plate; a pad pin inserted to the pad guard movably in an axis direction and having a through hole; a pad provided at a tip of the pad pin and having a through hole connected to the through hole of the pad pin; and an elastic body provided between the base plate and the pad pin for giving to the pad pin a force in its tip direction; and a sealing body for forming an airtight chamber on a base end side of the pad pin; for holding by suction a device by the pad by applying a negative pressure to the airtight chamber, the through hole of the pad pin and the through hole of the pad.

In this device holding apparatus, a pad is brought close to a device to contact, and in this state, a negative pressure is applied to an airtight chamber, a through hole of a pad pin and a through hole of a pad. As a result, the device is sucked by the pad, and at the same time, an elastic body is shrank due to the negative pressure applied to the through hole and the device is sucked and picked up together with the pad and the pad pin.

In the present invention, since the pad and the pad pin are provided on a base plate via the elastic body, it is possible to surely hold a device by suction without using a rubber pad and it becomes particularly suitable to a use in a low temperature environment.

Also, a force acting on the device at the time of bringing the pad close to the device to contact is only own weights of the pad and the pad pin and a reacting force of the elastic body. Accordingly, by suitably adjusting an elasticity coefficient of the elastic body, the force to be acted on the device is small even if the pad approaches at a high speed, and the possibility of damaging the device becomes less. Furthermore, since the force acting on the device is small as such, the pad can be comprised of conductive metal materials and an effect of removing static electricity is large.

Note that when releasing the devices, the negative pressure having been applied to the airtight chamber, through hole of the pad pin and through hole of the pad until then is stopped, or a positive pressure is brought to act to the contrary. As a result, the elastic body having been shrank until then is stretched and the pad and the pad pin were lowered and the device is released.

(3) It is not particularly limited in the above invention, but it is preferable that a tip of the pad is more protruding than that of the pad guard when the negative pressure is not applied.

Also, it is not particularly limited in the above invention, but it is preferable that the pad, pad pin and base plate are comprised of a conductive material.

Alternately, instead of this, it is more preferable that the pad guard is comprised of a conductive material and the device contacts the tip of the pad guard when the negative pressure is applied.

It is not particularly limited in the above invention, but the pad pin preferably comprises a rotation stop mechanism. An angle of a held device is aligned by the pad pin because of the provision of the rotation stop mechanism to it.

BRIEF DESCRIPTION OF THE DRAWINGS

These and other objects and features of the present invention will be explained in more detail below with reference to the attached drawings, which are given by way of illustration only, and thus are not limitative of the present invention, and wherein:

FIG. 6 is a sectional view for explaining an operation of the device holding apparatus shown in FIG. 5.

DESCRIPTION OF THE PREFERRED EMBODIMENTS

First Embodiment

Figure 1:
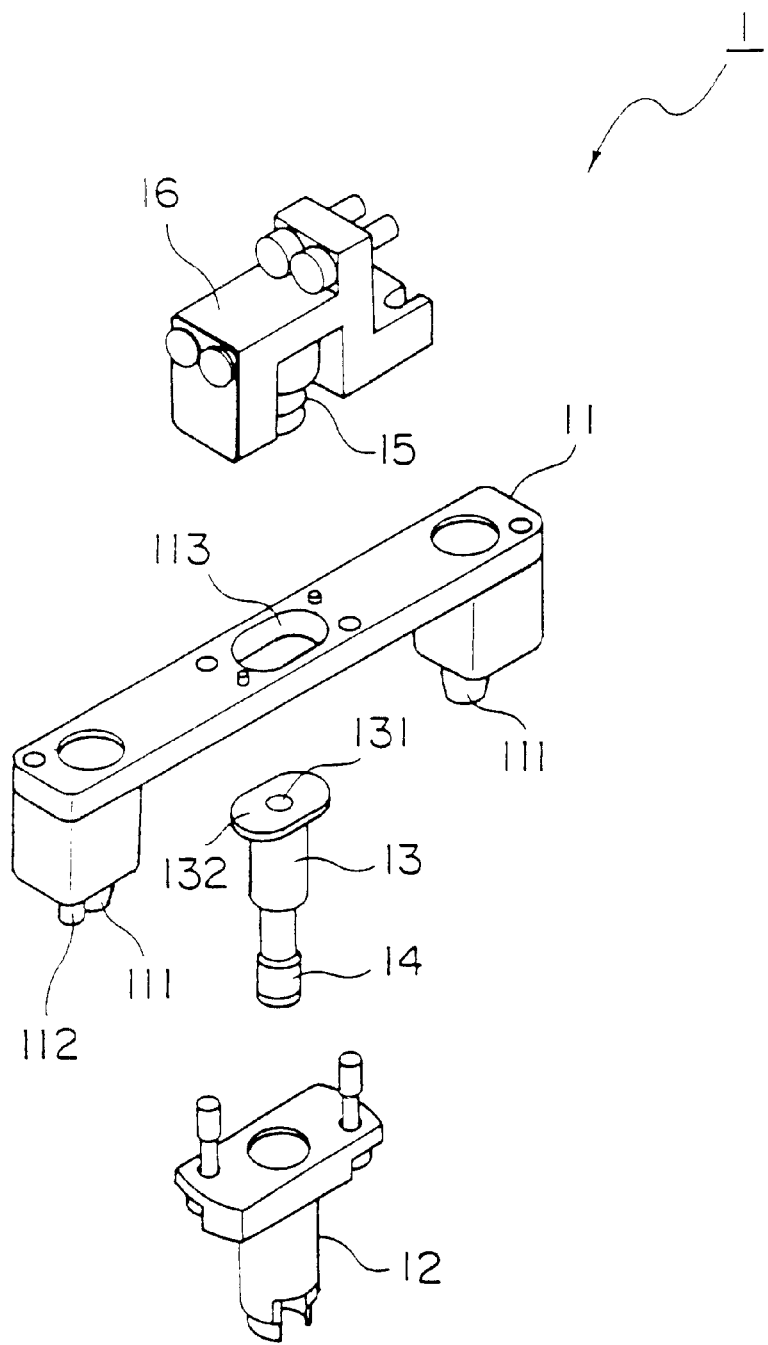
FIG. 1 is a disassembled perspective view of a device holding apparatus according to an embodiment of the present invention.
Figure 2:
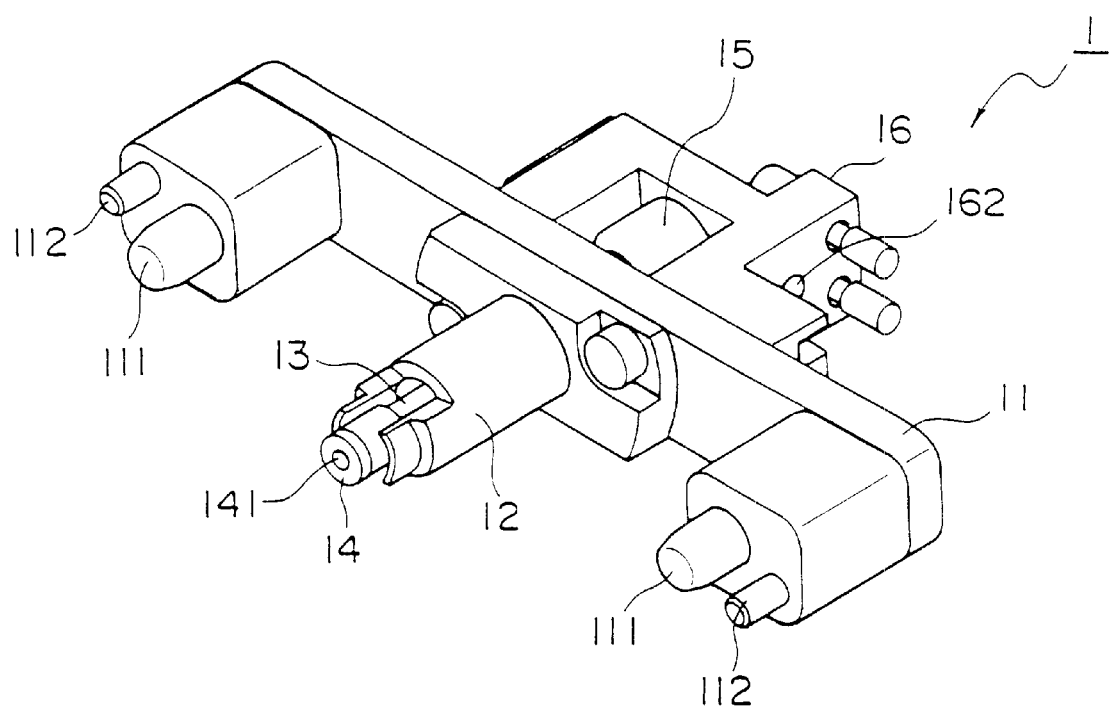
FIG. 2 is a perspective view from below of the device holding apparatus shown in FIG. 1.
Figure 3:
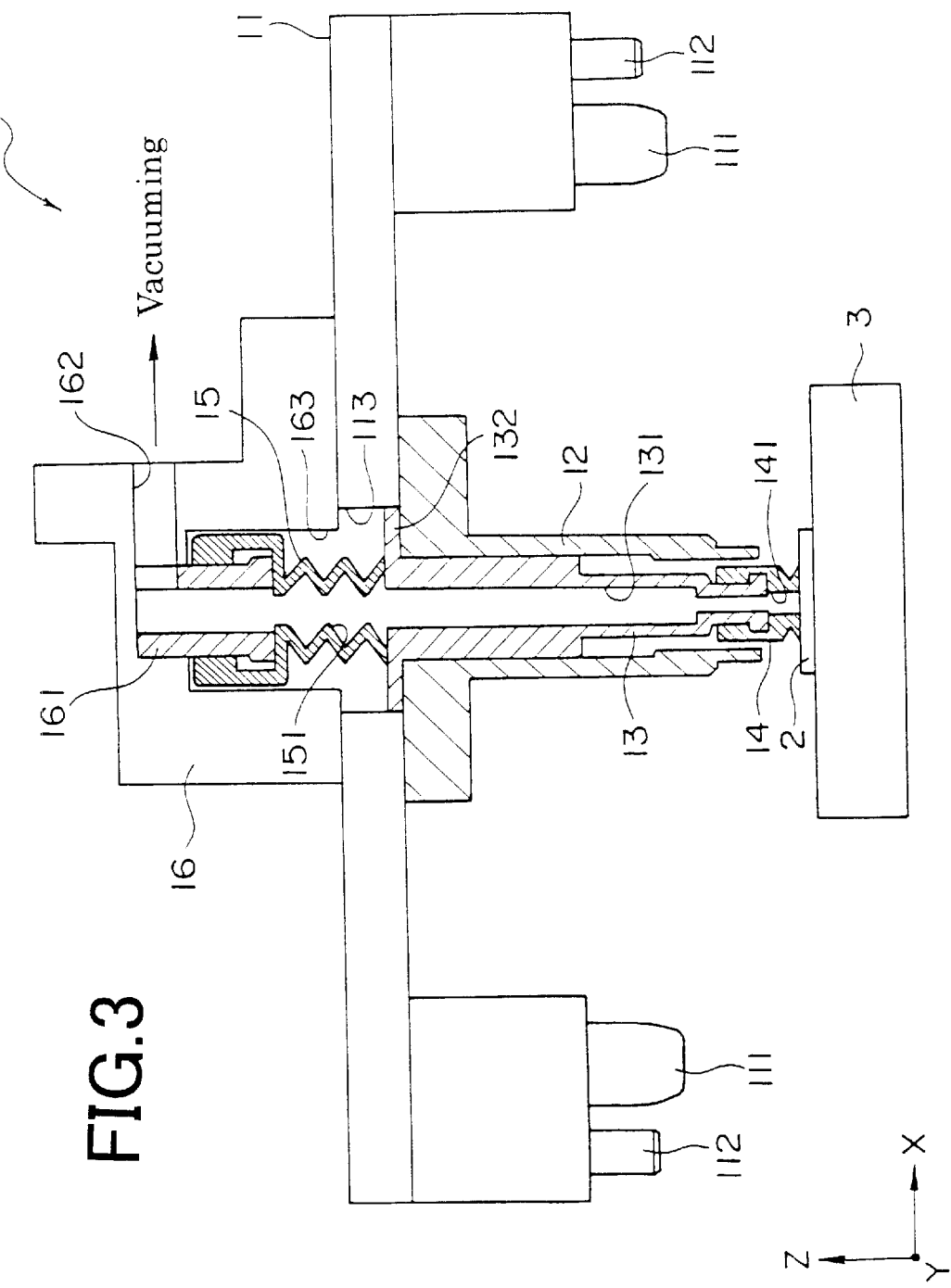
FIG. 3 is a sectional view for explaining an operation of the device holding apparatus shown in FIG. 1.
Figure 4:
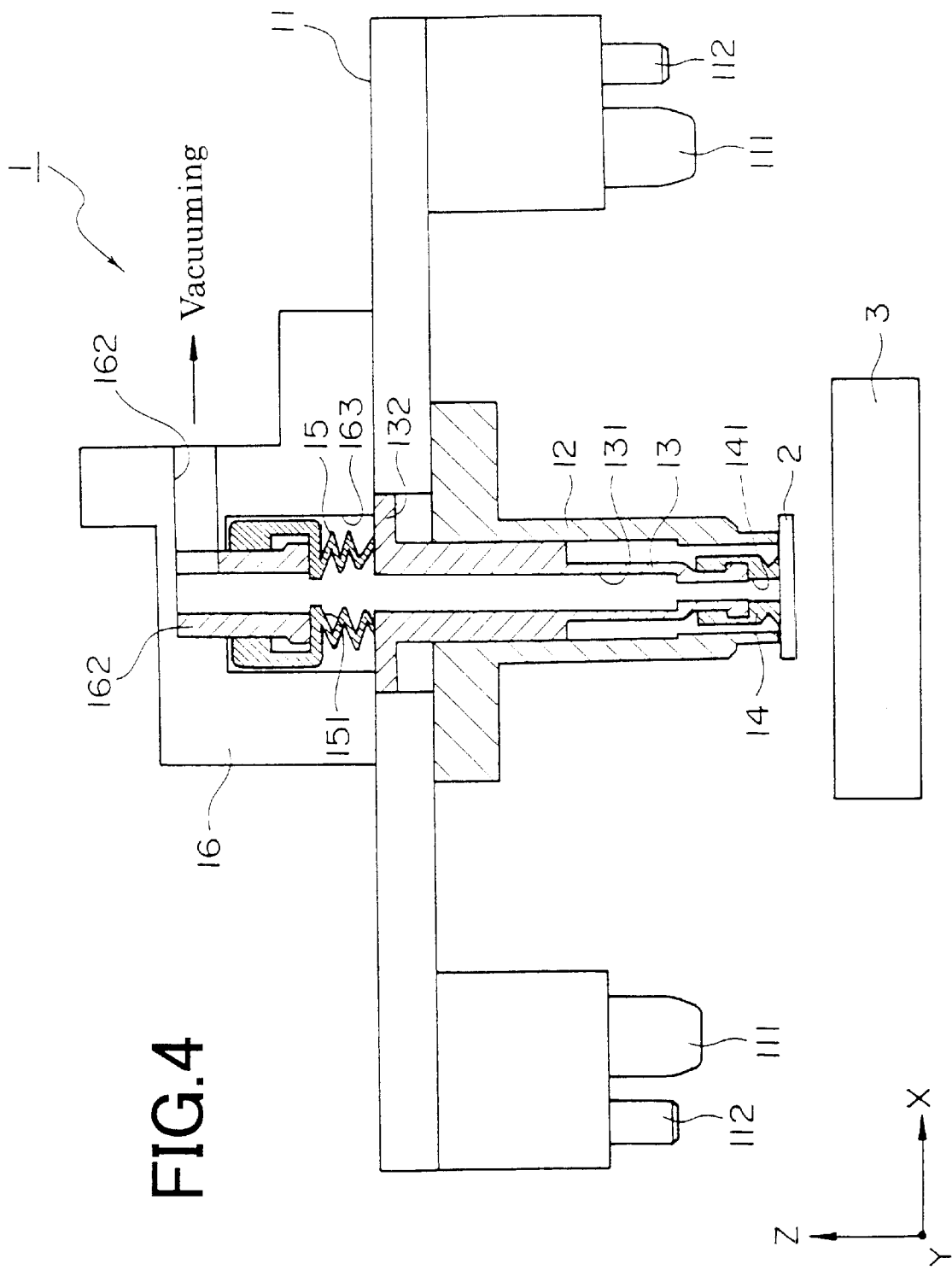
FIG. 4 is a sectional view for explaining an operation of the device holding apparatus shown in FIG. 1.

FIG. 1 is a disassembled perspective view of a device holding apparatus according to an embodiment of the present invention, FIG. 2 is a perspective view from below of the device holding apparatus shown in FIG. 1, and FIGS. 3 and 4 are sectional views for explaining an operation of the device holding apparatus shown in FIG. 1.

A device holding apparatus 1 of the present embodiment comprises a base plate 11, a hollow pad guard 12 provided on the base plate 11, a pad pin 13 having a through hole 131 inserted to the pad guard 12 movable in the axis direction, a pad 14 having a through hole 141 connected to the through hole 131 of the pad pin 13 and a bellows pad 15 provided on the base plate 11, having a through hole 151 connected to the through hole 131 of the pad pin 13, and stretchable in the axis direction.

The base plate 11 is mounted on an XYZ-axis drive mechanism outside the drawing and the entire base plate 11 is movable about an X-axis, Y-axis and Z-axis of an electric device testing apparatus, etc. The base plate 11 is provided with an alignment pin 111 for aligning to a tray, etc. loaded with an IC chip 2 to be held and a push pin 112.

The pad guard 12 is fixed on a lower surface of the base plate 11 with a screw, etc. and a pad pin 13 is inserted therein as shown in FIG. 3 so that the pad pin 13 is movable up and down only in the Z-axis direction.

The pad pin 13 is formed a through hole 131 inside and the above pad guard 12 is inserted thereto. A not circle flange 132 (a long circle in the present embodiment) is formed at an upper end of the pad pin 13, and by fitting the long circle flange 132 in a also long circle through hole 113 formed on the base plate 11, the pad pin 13 is unable to rotate about the Z-axis direction. Note that the pad pin 13 is movable in the Z-axis direction about the pad guard 12 and base plate 11 as shown in FIG. 3.

A pad 14 contacting the IC chip 2 is airtightly fit in at the tip of the pad pin 13 and a through hole 141 is formed inside. The pad 14 can be suitably changed for use in accordance with a size and shape of the IC chip to be held.

On the other hand, a block 16 for supporting the bellows pad 15 is fixed on the upper surface of the base plate 11 and an upper end of the bellows pad 15 is fixed by using a pin 161. The block 16 is formed a through hole 162 connecting to a vacuum generation apparatus (negative pressure generation apparatus) outside the drawing, also the bellows pad 15 is formed a through hole 151. The through hole 162 of the block 16, the through hole 151 of the bellows pad 15, the through hole 131 of the above pad pin 13 and the through hole 141 of the pad 14 are connected in an airtight state.

The bellows pad 15 is comprised of an elastic material, such as rubber, and its bellows portion is elastic. The lower end of the bellows portion is provided so as to contact the flange 132 of the pad pin 13.

Note that on the junction face of the lower surface of the block 16 and an upper surface of the base plate 11, a diameter (width) of an concave portion 163 of the block 16 is set smaller than the diameter of the through hole 113 of the base plate 11. As a result, even if the pad pin 13 moves up, an upper limit is decided by the flange 132 contacting the pad pin 13. Namely, the block 16 has a stopper function of the pad pin 13.

Also, in the present embodiment, the pad 14, pad pin 13, pad guard 12 and base plate 11 are comprised of a highly conductive metal material and static electricity charged in the IC chip is released to the ground via the pad 14, pad pin 13, pad guard 12 and base plate 11.

An operation will be explained next.

When holding an IC chip, the base plate 11 is first moved to right above the IC chip 2 loaded on the tray 3, etc. and then lowered until the pad 14 touches the IC chip 2.

FIG. 3 shows the state, where a force acting on the IC chip 2 at this time is only own weights of the pad 14 and the pad pin 13 and a reacting force of an elastic force of the bellows pad 15. Accordingly, if the pad 14 collides with the IC chip 2 at the time of lowering the base plate 11 at a high speed, a force to be acted on the IC chip 2 is small and likeliness to be damaged is small. Also, since the force to be acted on the IC chip 2 is small as such, the pad 14 can be comprised of a conductive metal material, etc. as explained above. As a result, static electricity charged on the IC chip 2 can be released to the ground via the pad 14, pad pin 13, pad guard 12 and base plate 11, so that it is possible to prevent the IC chip from being damaged by the static electricity.

As shown in FIG. 3, the pad 14 is brought to contact the IC chip 2, the vacuum drawing is performed in this state, and a negative pressure is applied to the through hole 162 of the block 16, the through hole 151 of the bellows pad 15, the through hole 131 of the pad pin 13 and the through hole 141 of the pad 14. As a result, the IC chip adheres by suction to the pad 14. At the same time, the negative pressure applied to the through holes 141, 131, 151 and 162 shrinks a bellows portion of the bellows pad 15 as shown in FIG. 4, and the IC chip 2 together with the pad 14 and the pad pin 13 is picked up by suction. Note that the bellows pad 15 continues to shrink until the flange 132 of the pad pin 13 touches the lower surface of the block 16.

As shown in FIG. 4, after the IC chip 2 is held, the base plate 11 is elevated to be moved to a desired position.

It is sufficient to conduct an inversed operation to release the held IC chip 2. Namely, the base plate 11 is moved to right above a desired tray 3 and lowered until the pad 14 holding the IC chip 2 comes to a slightly upper position of the desired position of the tray 3. The vacuum drawing is stopped in this state and the negative pressure having been applied to the through hole 162 of the block 16, the through hole 151 of the bellows pad 15, the through hole 131 of the pad pin 13 and the through hole 141 of the pad 14 is released. At this time, a positive pressure may be applied for improved releasing of the IC chip 2. Consequently, the bellows pad 15 having been shrank until then stretches due to its own elasticity, the pad 14 and the pad pin 13 are pressed downward as shown in FIG. 3, and the IC chip 2 touches the tray 3 and is released there.

Second Embodiment

Figure 5:
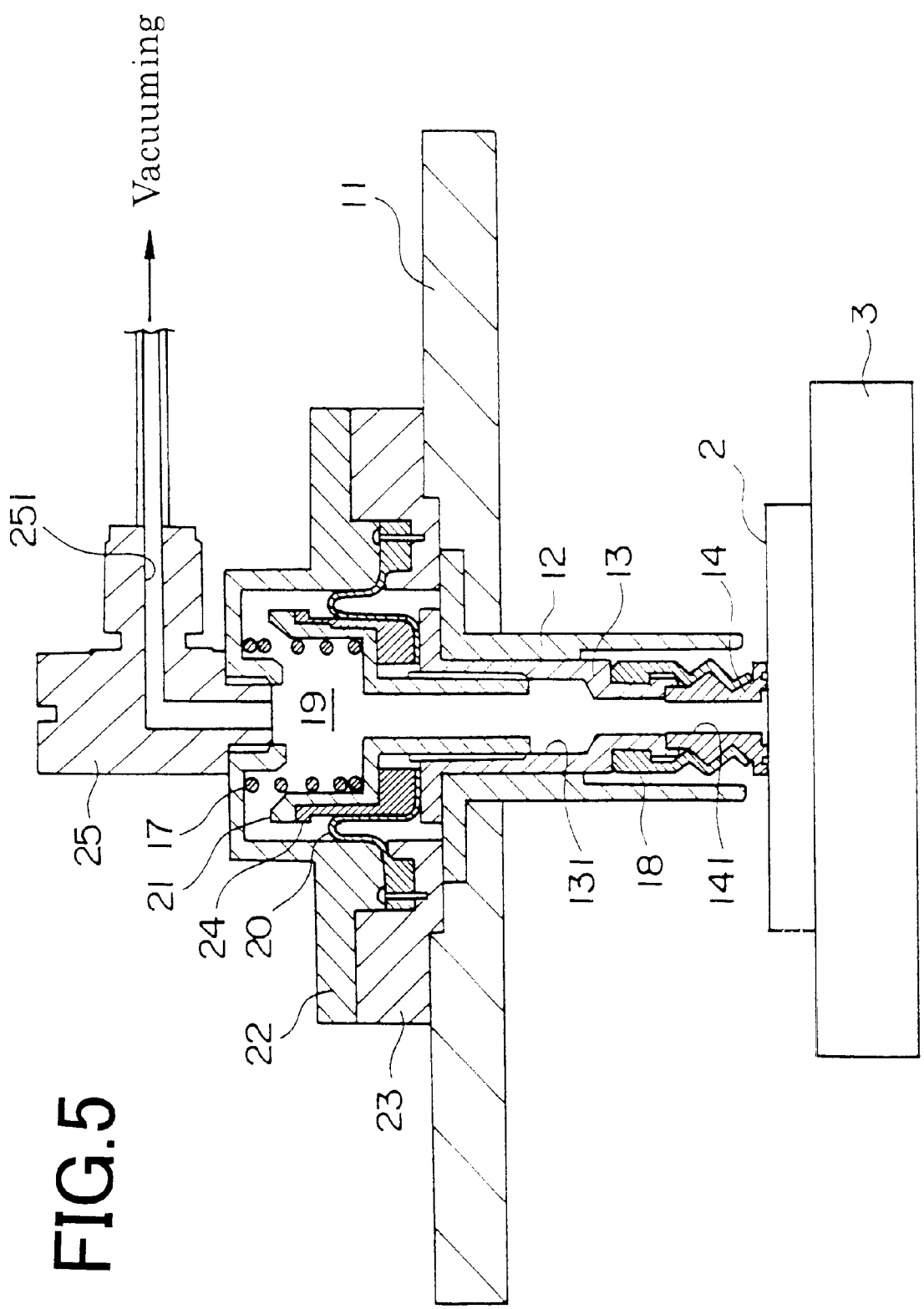
FIG. 5 is a sectional view of another embodiment of a device holding apparatus of the present invention.

FIG. 5 is a sectional view of another embodiment of a device holding apparatus of the present invention and FIG. 6 is a sectional view for explaining an operation of the device holding apparatus.

The device holding apparatus 1 of the present embodiment uses a spring 17 instead of the bellows pad 15 comparing with the above first embodiment.

Namely, there comprises a base plate 11, a hollow pad guard 12 provided on the base plate 11, a pad pin 13 having a through hole 131 inserted to the pad guard 12 movably in the axis direction, a pad 14 having a through hole 141 connected to the through hole 131 of the pad pin 13 attached to a tip of the pad pin 13, a pad holder 18 provided to surround the pad pin 13 and the pad 14, a spring 17 (an elastic body of the present invention) for giving a force to the pad pin 13 in the direction to its tip, and a packing 20 (a sealing body of the present invention) for forming an airtight chamber 19 on the base end side of the pad pin 13.

Here, the spring 17 is provided between the spring holder 21 provided at the base end of the pad pin 13 and the block 22. Also, the packing 20 is held at its outer diameter by being sandwiched between the block 22 and the block 23 and held at its inner diameter being sandwiched between the pad pin 13 and the spring holder 21 via a retainer 24. The airtight chamber 19 is to be formed between the through hole 131 of the pad pin 13 and the through hole 251 of the block 25 due to the existence of the packing 20.

In the present embodiment, the pad 14, pad pin 13, pad guard 12 and base plate 11 are comprised of a highly conductive metal material and static electricity charged on an IC chip is released to the ground via the pad 14, pad pin 13, pad guard 12 and base plate 11.

An operation will be explained next.

When holding an IC chip, the base plate 11 is first moved to right above the IC chip 2 loaded on the tray 3, etc. and then lowered until the pad 14 touches the IC chip 2.

FIG. 5 shows the above state. In the device holding apparatus 1 of the present embodiment, since the spring 17 gives to the pad 14 movability in the Z-axis direction without using a rubber material, etc. which becomes hard in a low temperature environment, etc., there is no possibility of a positioning error caused by shrink of such a rubber material and the IC chip 2 can be precisely held.

Also, a force acting on the IC chip 2 in the state shown in FIG. 5 is only own weights of the pad 14 and the pad pin 13 and an elastic force of the spring 17. Accordingly, when an elasticity coefficient of the spring 17 is adjusted in accordance with need, even if the pad 14 collides with the IC chip 2 at the time of lowering the base plate 11 at a high speed, a force acting on the IC chip 2 is small and the possibility of damaging the IC chip 2 is small. Also, since the force acting on the IC chip 2 is small as such, the pad 14 can be comprised of a conductive metal material as explained above. As a result, static electricity charged on the IC chip 2 can be released to the ground via the pad 14, pad pin 13, pad guard 12 and base plate 11, so that it is possible to prevent the IC chip from being damaged by static electricity.

As shown in FIG. 5, the pad 14 is brought to contact the IC chip 2, the vacuum drawing is performed in this state, and a negative pressure is applied to the through hole 251 of the block 25, the airtight chamber 19, the through hole 131 of the pad pin 13 and the through hole 141 of the pad 14. As a result, the IC chip 2 adheres by suction to the pad 14. At the same time, the negative pressure applied to the through holes 141, 131, airtight chamber 19 and through hole 251 shrinks the spring 17 as shown in FIG. 6, and the IC chip 2 together with the pad 14 and the pad pin 13 is picked up by suction. Note that the spring 17 continues to shrink until the upper end of the spring holder 21 touches an inner surface of the block 22.

As shown in FIG. 6, after the IC chip 2 is held, the base plate 11 is elevated to be moved to a desired position.

It is sufficient to conduct an inversed operation to release the held IC chip 2. Namely, the base plate 11 is moved to right above a desired tray 3 and lowered until the pad 14 holding the IC chip 2 comes to a slightly upper position of the desired position of the tray 3. The vacuum drawing is stopped in this state and the negative pressure having been applied to the through hole 251 of the block 25, the airtight chamber 19, the through hole 131 of the pad pin 13 and the through hole 141 of the pad 14 is released. At this time, a positive pressure may be applied for improved releasing of the IC chip 2. Consequently, the spring 17 having been shrank until then stretches due to its own elasticity, the pad 14 and the pad pin 13 are pressed downwardly as shown in FIG. 5, and the IC chip 2 touches the tray 3 and is released there.

Note that the embodiments explained above were described to facilitate the understanding of the present invention and not to limit the present invention. Accordingly, elements disclosed in the above embodiments include all design modifications and equivalents belonging to the technical field of the present invention.

What is claimed is:

1. A device holding apparatus, comprising:

a base plate comprised of a conductive material;

a hollow pad guard provided on said base plate;

a pad pin comprise of a conductive material and inserted to said pad guard movable in an axis direction and having a through hole;

a pad comprised of conductive material and provided at a tip of said pad pin and having a through hole connected to the through hole of the pad pin; and an elastic body provided between said base plate and said pad pin for giving to said pad pin a force in its tip direction; and a sealing body for forming an airtight chamber on a base end side of said pad pin;

for holding by suction a device by said pad by applying a negative pressure to said airtight chamber, the through hole of said pad pin and the t rough hole of said pad.

2. The device holding apparatus as set forth in claim 1 wherein a tip of said p d is more protruding than a tip of said pad guard when said negative pressure is not applied.

3. The device holding apparatus as set forth in claim 1, wherein said pad guard is comprised of a conductive material and said device contacts the tip of said pad guard when said negative pressure is applied.

4. The device holding apparatus as set forth in claim 2, wherein said pad guard is comprised of a conductive material and said device contacts the tip of said pad guard when said negative pressure is applied.

5. The device holding apparatus as set forth in claim 1, wherein said pad pin comprises a rotation stop mechanism.

6. The device holding apparatus as set forth in claim 2, wherein said pad pin comprises a rotation stop mechanism.

7. The device holding apparatus as set forth in claim 3, wherein said pad pin comprises a rotation stop mechanism.

8. The device holding apparatus as set forth in claim 4, wherein said pad pin comprises a rotation stop mechanism.

* * * * *